US011025486B2

(12) United States Patent
Savalle et al.

(10) Patent No.: US 11,025,486 B2
(45) Date of Patent: Jun. 1, 2021

(54) CASCADE-BASED CLASSIFICATION OF NETWORK DEVICES USING MULTI-SCALE BAGS OF NETWORK WORDS

(71) Applicant: Cisco Technology, Inc., San Jose, CA (US)

(72) Inventors: Pierre-André Savalle, Rueil-Malmaison (FR); Jean-Philippe Vasseur, Saint Martin D'uriage (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 193 days.

(21) Appl. No.: 16/164,882

(22) Filed: Oct. 19, 2018

(65) Prior Publication Data

US 2020/0127892 A1 Apr. 23, 2020

(51) Int. Cl.
*G06F 15/177* (2006.01)
*H04L 12/24* (2006.01)
(Continued)

(52) U.S. Cl.
CPC ........ *H04L 41/0806* (2013.01); *G06K 9/6256* (2013.01); *G06K 9/6267* (2013.01); *H04L 41/0893* (2013.01); *H04L 67/12* (2013.01)

(58) Field of Classification Search
CPC ............. H04L 63/1416; H04L 63/1425; H04L 63/1441; H04L 47/2433; H04L 47/2441; H04L 47/2458; H04L 47/2483; H04L 47/2491; H04L 65/4069; H04L 65/80; H04L 41/0893; H04L 41/0896; H04L 41/5022; H04L 41/5029; H04L 41/5051; H04L 47/12; H04L 47/20; H04L 47/801;
(Continued)

(56) References Cited

U.S. PATENT DOCUMENTS 9,455,872 B2 9/2016 Lingen
9,667,636 B2 5/2017 Komarek et al.
(Continued)

OTHER PUBLICATIONS

Bengio, et al., "Label Embedding Trees for Large Multi-Class Tasks", Advances in Neural Information Processing Systems, pp. 163-171. 2010.
(Continued)

*Primary Examiner* — Farzana B Huq
(74) *Attorney, Agent, or Firm* — Behmke Innovation Group LLC; Kenneth J. Heywood; Jonathon P. Western

(57) ABSTRACT

In one embodiment, a device classification service extracts, for each of a plurality of time windows, one or more sets of traffic features of network traffic in a network from traffic telemetry data captured by the network. The service represents, for the time windows, the extracted one or more sets of traffic features as feature vectors. A feature vector for a time window indicates whether each of the traffic features was present in the network traffic during that window. The service trains, using a training dataset based on the feature vectors, a cascade of machine learning classifiers to label devices with device types. The service uses the classifiers to label a particular device in the network with a device type based on the traffic features of network traffic associated with that device. The service initiates enforcement of a network policy regarding the device based on its device type.

16 Claims, 10 Drawing Sheets

(51) Int. Cl.
*H04L 29/08* (2006.01)
*G06K 9/62* (2006.01)

(58) Field of Classification Search
CPC ... H04L 47/805; H04L 47/822; H04L 47/824; H04L 47/2416; H04L 43/08; H04L 43/0822; H04L 43/0876; H04L 43/062; H04L 43/806
USPC .......................................... 709/214, 222–224
See application file for complete search history.

(56) References Cited

U.S. PATENT DOCUMENTS

| | | |
|---|---|---|
| 9,686,023 B2 | 6/2017 | Sridhara et al. |
| 2011/0040706 A1* | 2/2011 | Sen ........................ G06N 20/00 706/12 |
| 2014/0012940 A1* | 1/2014 | Joshi ................... G06F 9/45558 709/214 |
| 2018/0198838 A1* | 7/2018 | Murgia ............... H04L 47/2433 |
| 2018/0234302 A1 | 8/2018 | James et al. |
| 2018/0375773 A1* | 12/2018 | Gobriel ............... H04L 61/2046 |

OTHER PUBLICATIONS

Choromanska, et al., "Logarithmic Time Online Multiclass prediction", arXiv:1406.1822v13, 15 pages, Nov. 14, 2015., arXiv.org.
Liu, et al., "Probabilistic Label Trees for Efficient Large Scale Image Classification", 2013 IEEE Conference on Computer Vision and Pattern Recognition, Portland, OR, pp. 843-850, 2013.
Meidan, et al., "ProfilIoT: A Machine Learning Approach for IoT Device Identification Based on Network Traffic Analysis", SAC'17, Apr. 3-7, 2017, Marrakech, Morocco, 4 pages, 2017, ACM.

* cited by examiner

CASCADE-BASED CLASSIFICATION OF NETWORK DEVICES USING MULTI-SCALE BAGS OF NETWORK WORDS

TECHNICAL FIELD

The present disclosure relates generally to computer networks, and, more particularly, to cascade-based classification of network devices using multi-scale bags of network words.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory. However, with the ever-increasing number and variety of IoT devices, it may also be the case that the device type is not initially known to the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
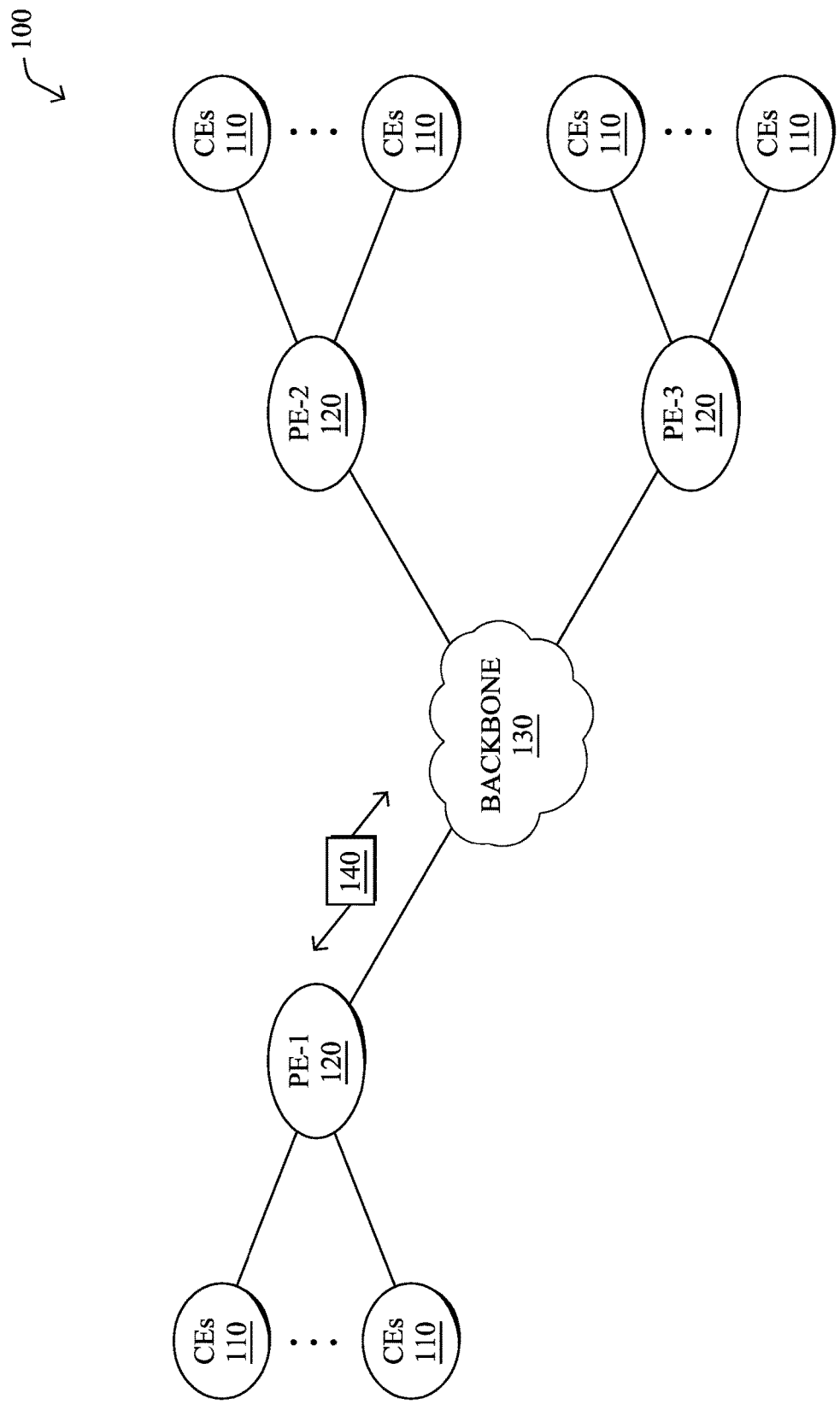
FIGS. 1A-1B illustrate an example communication network.

According to one or more embodiments of the disclosure, a device classification service extracts, for each of a plurality of time windows, one or more sets of traffic features of network traffic in a network from traffic telemetry data captured by the network. The service represents, for each of the time windows, the extracted one or more sets of traffic features as feature vectors. A particular feature vector for a particular time window indicates whether each of the traffic features was present in the network traffic during that time window. The service trains, using a training dataset based on the feature vectors, a cascade of machine learning classifiers to label devices in the network with device types. The service uses the cascade of machine learning classifiers to label a particular device in the network with a device type based on the traffic features of network traffic associated with the particular device. The service initiates enforcement of a network policy regarding the particular device based on its device type label.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
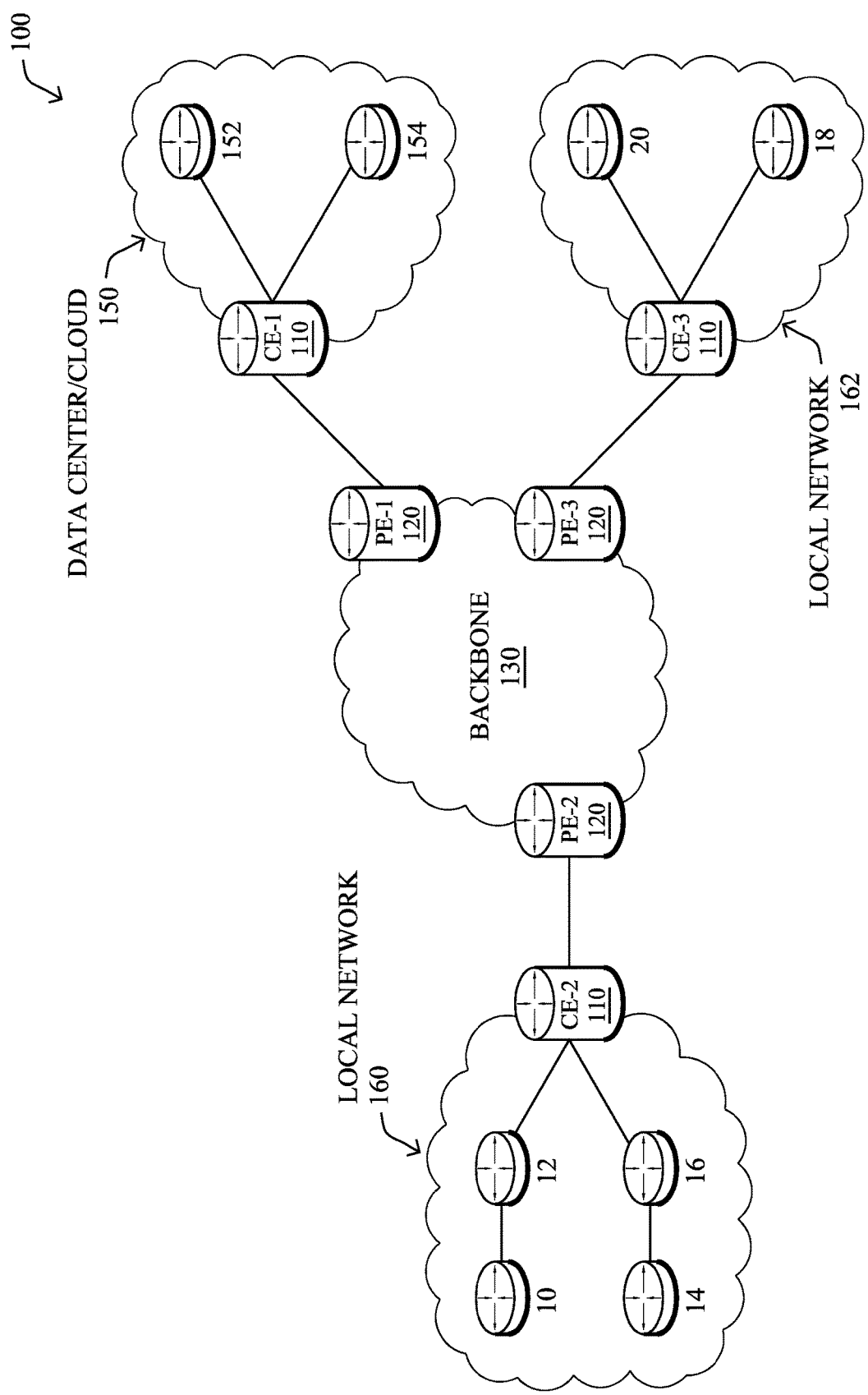

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
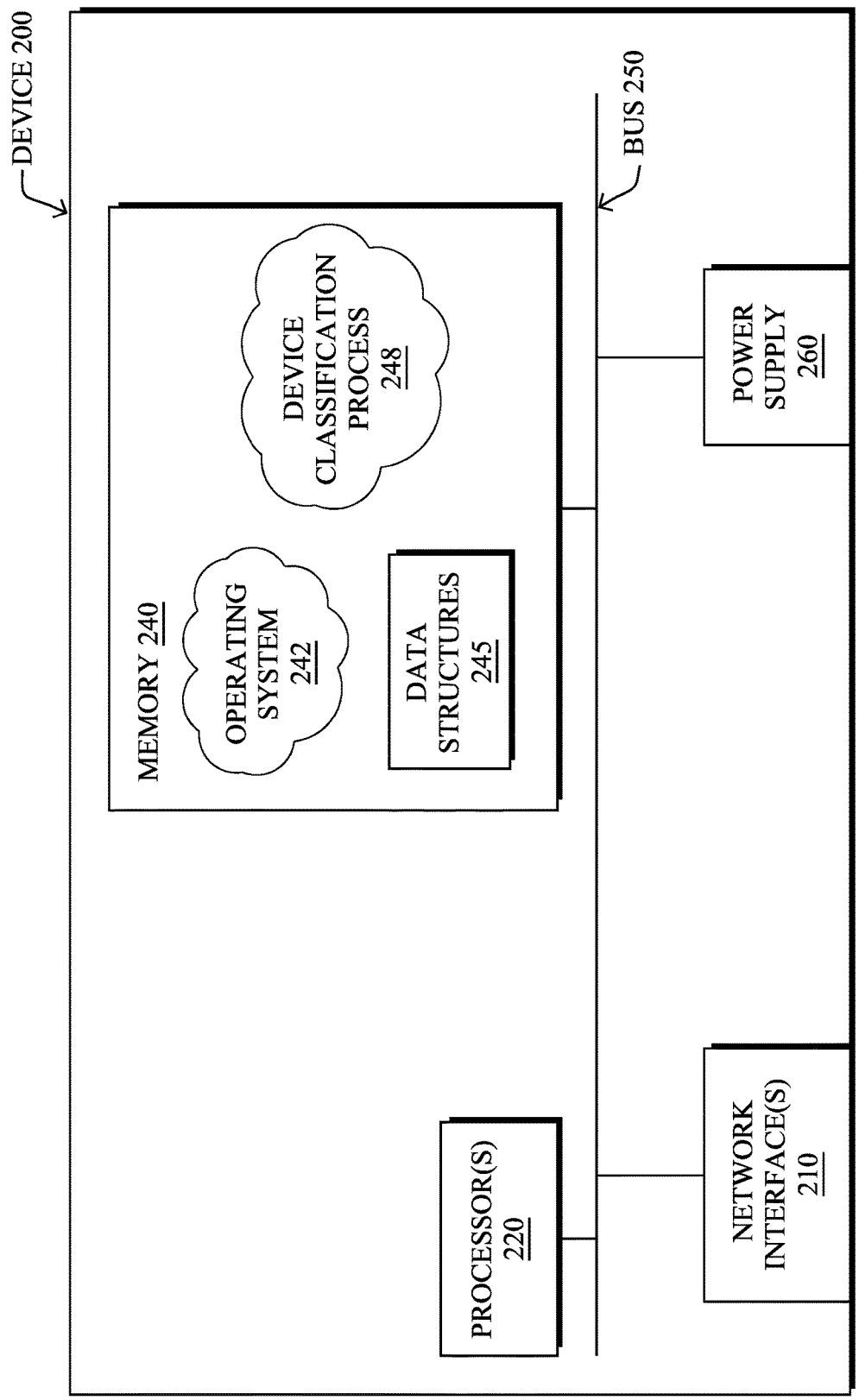
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
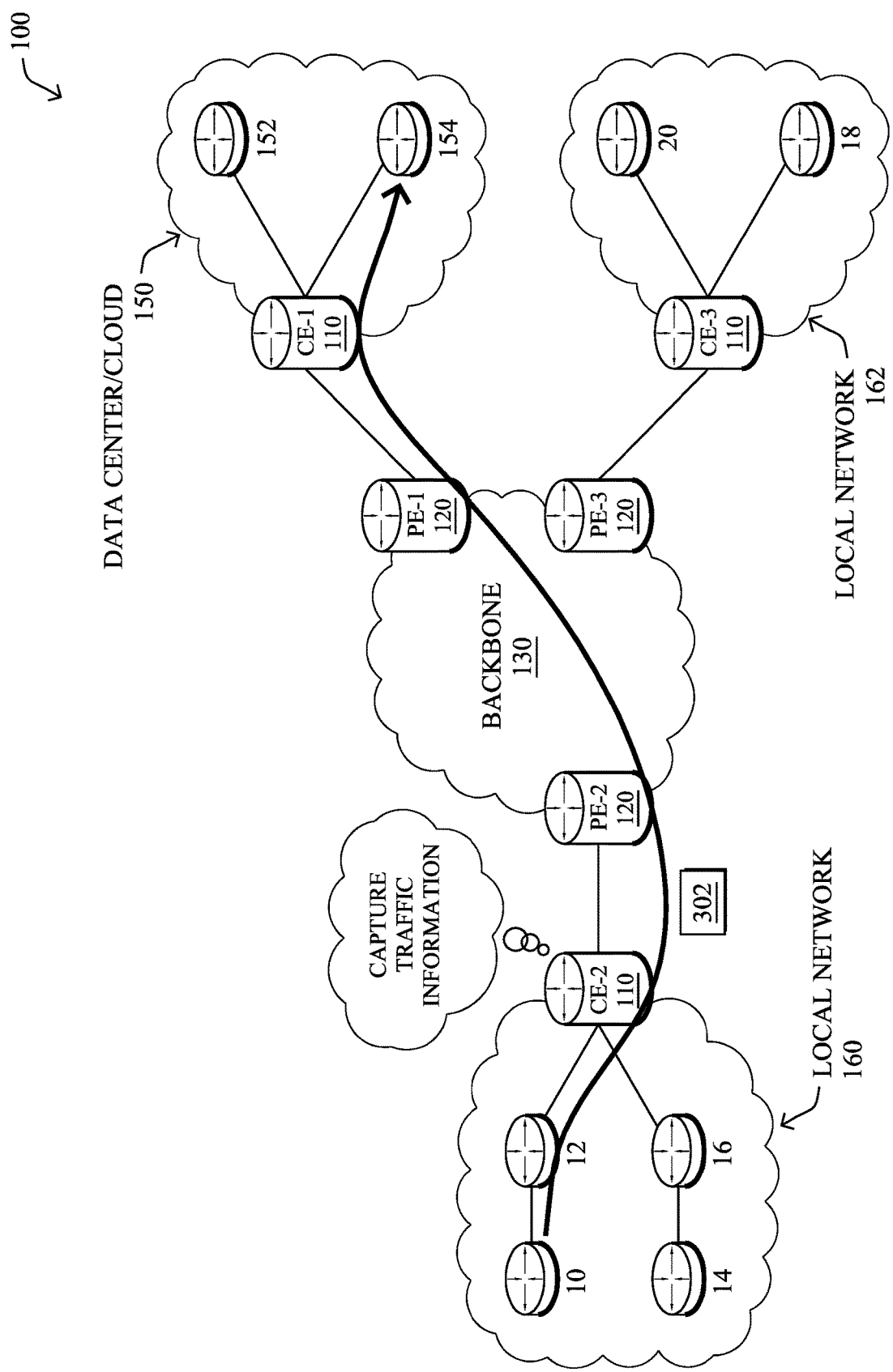
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example captured features may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

More specifically, most device classification systems (DCSs) today rely on simple rules and heuristics to classify devices. For instance, information extracted from DHCP or HTTP traffic can sometimes provide a pretty good clue as to the type of device. Notably, the DHCP vendor class identifier may directly indicate that the device is an Android phone, while the HTTP user agent may reveal more information about the operating system of the device. Similarly, the organizationally unique identifier (OUI) can be used to narrow down potential device types based on the corresponding manufacturer. In a sense, the device itself is informing the system of what it is.

While cues such as DHCP vendor class identifier, OUI, etc., offer useful clues to classify the device type of certain devices, these often fail for classifying specific and rarer devices. The explosion of IoT devices makes the problem worse, with many legacy devices not supporting the protocol extensions needed for device classification. For those devices, a foolproof rule where one can more or less "read" the device type in one of the message from the device's traffic usually doesn't exist. In addition, "recipes" that work for one type of device often fail for another, as protocols and devices may exhibit widely different behaviors (e.g., very different FSMs, different time scales used in protocols, etc.). In addition, traditional rule-based classification systems usually cannot scale to a large number of rules and devices, imposing limitations on the number of rules that the user can load for the system to recognize. This poses a serious issue to extend existing systems to orders of magnitude more device types.

Cascade-Based Classification of Network Devices Using Multi-Scale Bags of Network Words The techniques herein introduce a method based on statistical learning for building a device classification system that can identify a large number of devices, while keeping computational requirements low, both in terms of CPU and memory. Using multi-scale representations, the techniques herein can capture both long term protocol behaviors and very short term FSMs, leading to superior performance for device classification. In some aspects, in contrast to other potential approaches, the techniques herein rely on a cascade-based approach which makes the classification complexity not scale linearly with the number of devices to recognize.

Specifically, according to one or more embodiments of the disclosure as described in detail below, a device classification service extracts, for each of a plurality of time windows, one or more sets of traffic features of network traffic in a network from traffic telemetry data captured by the network. The service represents, for each of the time windows, the extracted one or more sets of traffic features as feature vectors. A particular feature vector for a particular time window indicates whether each of the traffic features was present in the network traffic during that time window. The service trains, using a training dataset based on the feature vectors, a cascade of machine learning classifiers to label devices in the network with device types. The service uses the cascade of machine learning classifiers to label a particular device in the network with a device type based on the traffic features of network traffic associated with the particular device. The service initiates enforcement of a network policy regarding the particular device based on its device type label.

Illustratively, the techniques described herein may be performed by hardware, software, and/or firmware, such as in accordance with the device classification process 248, which may include computer executable instructions executed by the processor 220 (or independent processor of interfaces 210) to perform functions relating to the techniques described herein.

Figure 4:
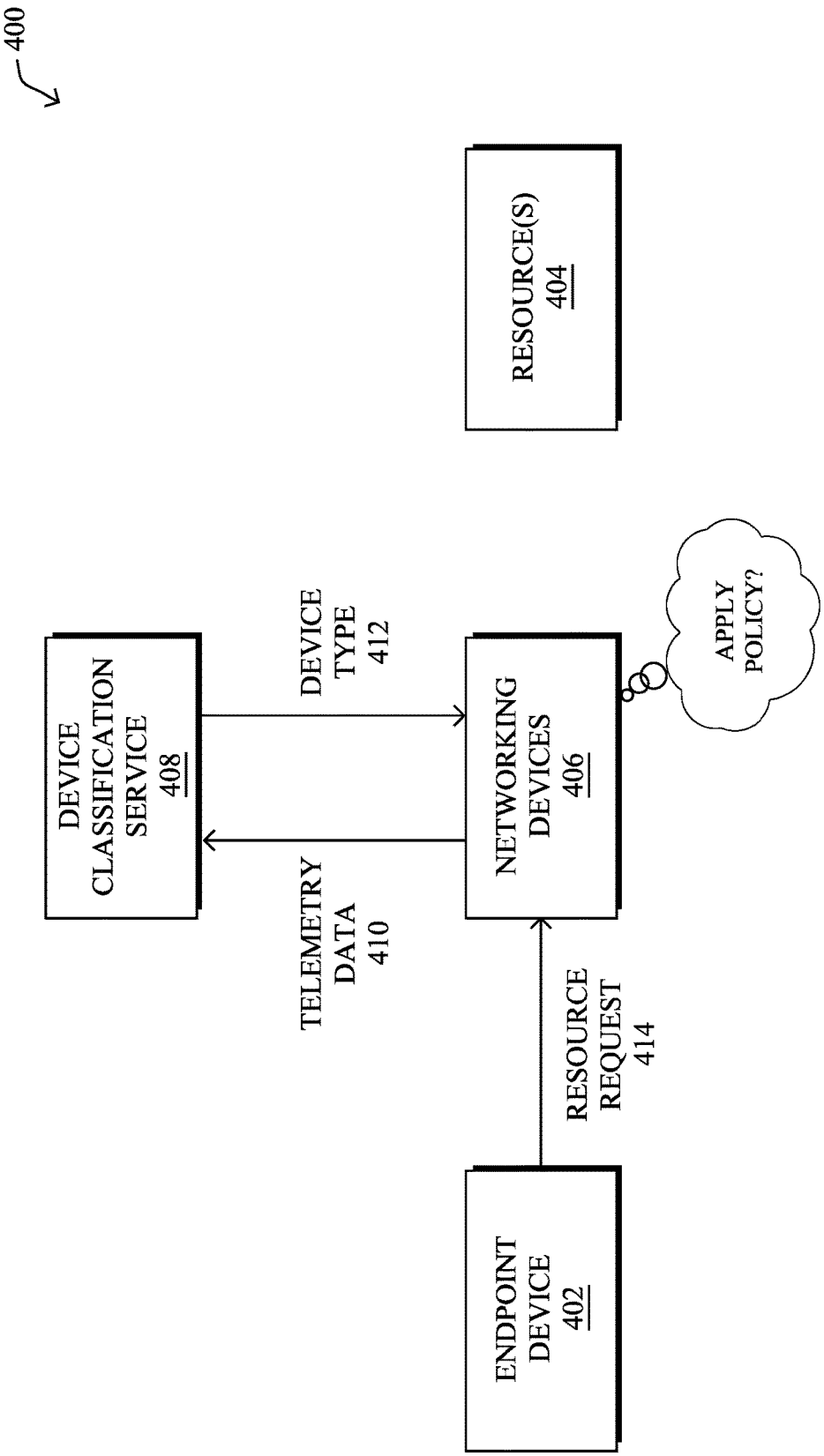
FIG. 4 illustrates an example of a device classification service in a network.

Operationally, FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. In general, device classification service 408 is configured to take as input telemetry data 410 is captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402.

Note that the classification of endpoint device 402 by service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the is device type of a device under scrutiny has traditionally used static rules and heuristics for the determination. For example, device type classification can be achieved by using active and/or passive probing of devices, to assign a device type and corresponding host profile to a device. Notably, this probing may entail sending any or all of the following probes:

DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021.

Figure 5:
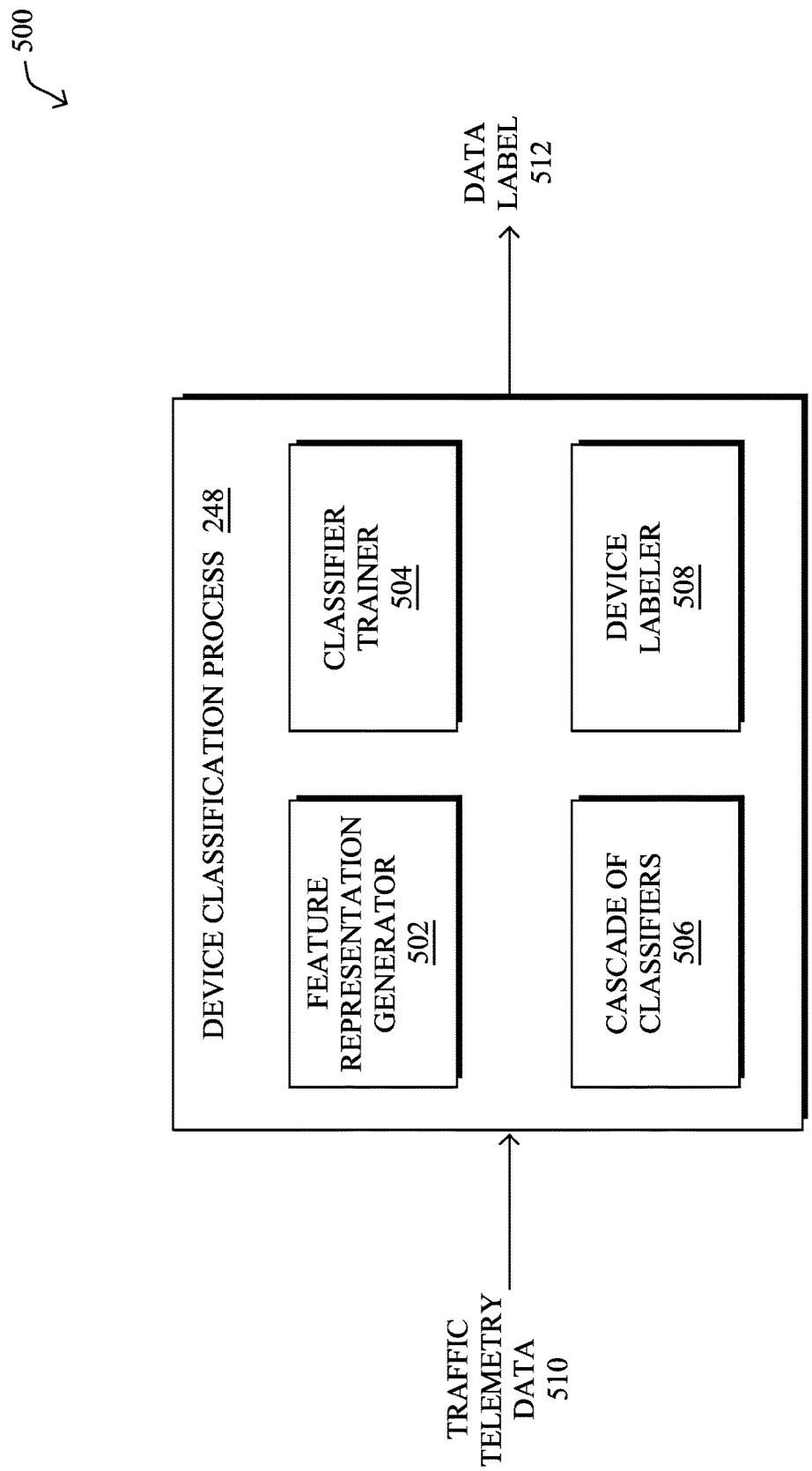
FIG. 5 illustrates an example architecture for cascade-based classification of network devices.

FIG. 5 illustrates an example architecture 500 for cascade-based classification of network devices, according to various embodiments. As shown, device classification process 248, which can be used to provide a device classification service (e.g., service 408 shown in FIG. 4) may comprise any or all of the following components: a feature representation generator 502, a classifier trainer 504, a cascade of classifiers 506, and/or a device labeler 508. Further, these components 502-608 may be implemented in a distributed manner or implemented as its own stand-alone service, either as part of the local network under observation or as a remote service. In addition, the functionalities of the components of architecture 500 may be combined, omitted, or implemented as part of other processes, as desired.

In various embodiments, feature representation generator 502 may be configured to build feature representations from the input traffic telemetry data 510 captured from the network and associated with traffic for the device undergoing classification. As described previously, traffic telemetry data 510 may include any or all information available regarding the traffic of the device such as raw packet information, Netflow or IPFIX records, DPI information, or the like.

In one embodiment, feature representation generator 502 may construct such a representation using a bag of words approach. Notably, for each device undergoing classification, and for each time window, feature representation generator 502 may produce a feature vector as follows:

Extract traffic features from traffic telemetry data 510 for a given time window. For instance, these traffic features could include a list of protocols or TCP/UDP ports used by the traffic of the device, the user agent from the HTTP header of HTTP traffic, DNS query information, etc.

For each potential feature, represent the feature as a binary value that indicates whether the feature was or was not present in the traffic. For instance, a binary value of '1' could represent that the traffic was addressed to a specific TCP port, where as a binary value of '0' could represent that a different port was used. In a given window, it is expected that only a few characteristics overall will be seen, so most of these representations will be '0,' meaning that the resulting feature vectors are considered to be sparse. In particular, not all features represented in a feature vector need to be stored by feature representation generator 502, as it is sufficient to store only the non-zero features.

Alternatively, instead of representing the presence of a given feature in a binary manner, feature representation generator 502 may instead assign a weight in the feature vector, to represent a frequency of the particular traffic feature being present in the network traffic during the time window associated with that feature vector.

Figure 6:
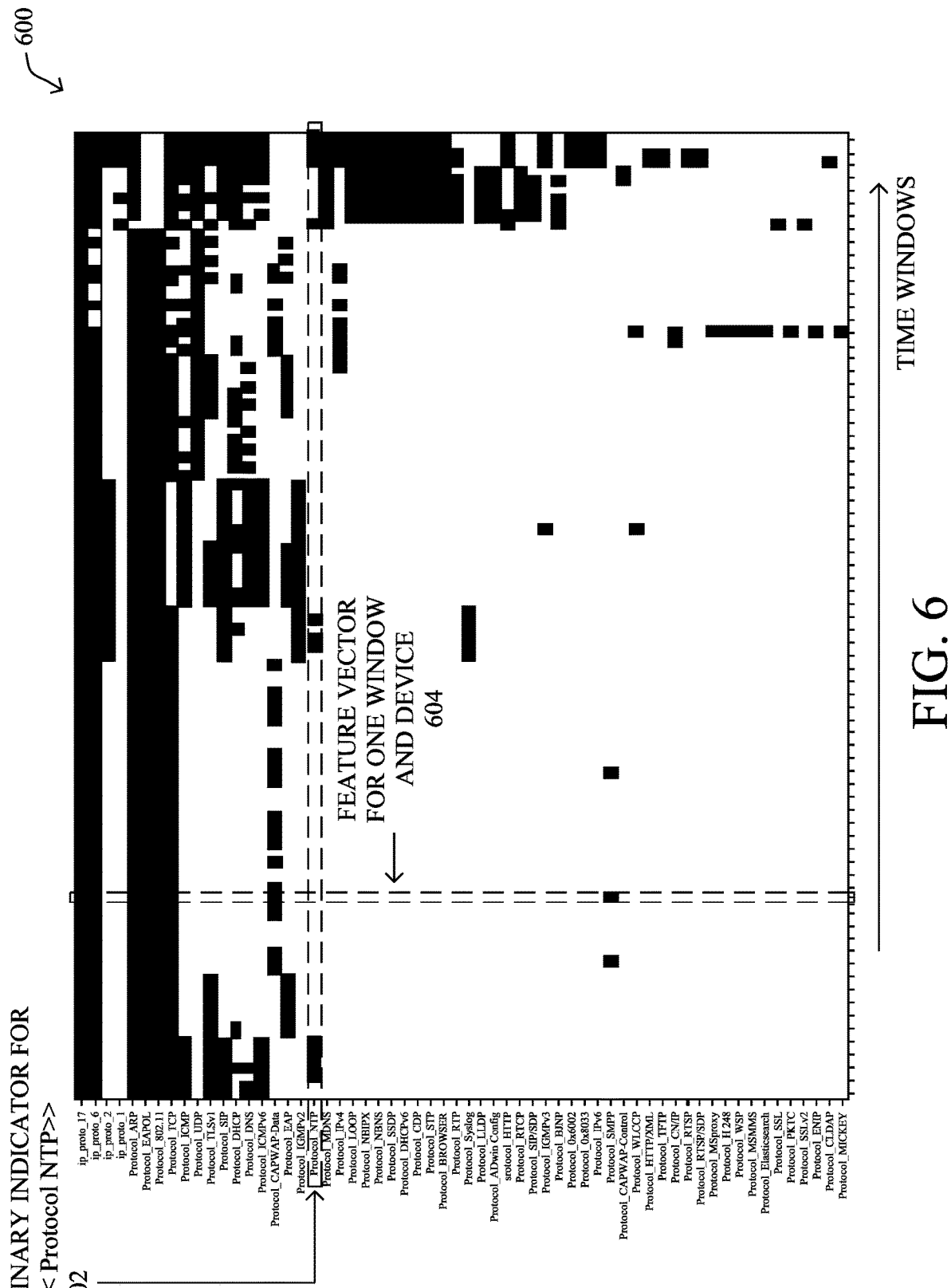
FIG. 6 illustrates an example of representing traffic features as feature vectors.

FIG. 6 illustrates an example 600 of representing traffic features as feature vectors, in various embodiments. As shown, there may be any number of traffic feature representations that indicate whether or not a particular traffic feature was observed during a given observation time window. For example, one feature may indicate whether the device traffic used the HTTP protocol, another may indicate whether the traffic used the DHCPv6 protocol, another may indicate whether the traffic used the IPv4 protocol, etc. As would be appreciated, the values of any given traffic feature may also change over time. For example, the binary indicator 602 may indicate the use of the NTP protocol by the device over time, and may change between '0' and '1' in different time windows.

Each column shown in example 600 may correspond to a different feature vector constructed by the feature representation generator. For example, feature vector 604 may be for a single time window and device and indicate that the SMPP protocol was observed in the traffic of the device, indicate that the NTP protocol was not, etc. Note that the majority of values in feature vector 604 are '0' during the corresponding time window.

Referring again to FIG. 5, the feature vectors formed by feature representation generator 502 can also be used to bootstrap higher dimension feature vectors that can account for multiple scales and statefulness, in various embodiments. For example, feature representation generator 502 may form further feature vectors as follows:

Using very small windows, each base feature vector becomes more and more precise. If feature representation generator 502 uses PCAP input data, each feature vector collapses into a single indicator of the nature and contents of a single packet. This allows feature representation generator 502 to capture very precise sequences of packets in protocols, thereby revealing some specific state transitions.

For a given device and window W, feature representation generator 502 may build a new feature vector $F_t,W= [f_{t-K},W, \ldots, f_t,W]$ where the base feature vectors f corresponding to the last K time points within time window W are aggregated together by feature representation generator 502. Sufficiently complex machine learning models can take advantage of this additional data to learn stateful patterns.

Using a single window size may work for certain protocols or device type, but may not be the right choice for others. For examples, very small windows are useful to infer the finite state machine (FSM) of the protocol, while longer windows are going to be much more robust to noisy devices that generate a lot of traffic if weighting is used. Accordingly, feature representation generator 502 may construct bigger feature vectors by aggregating feature vectors across multiple time windows of different sizes as follows: as $F_t=[F_t,W1; F_t,W2; F_t,W3; \ldots]$.

The resulting feature vectors can have very large dimensionality, but they are very sparse and hence not difficult to represent. In addition, feature representation generator 502 may leverage machine learning to perform the feature selection (i.e., determine which of the features are interesting to use), resulting in adaptive scale and amount of statefulness depending on the class or the protocol.

In various embodiments, architecture 500 may also include classifier trainer 504 that is configured to learn a cascade of sparse classifiers 506 from the feature vectors constructed by feature representation generator 502, as well as device type labels. Notably, classifier trainer 504 may use a training dataset in which known device type labels are applied to the feature vectors generated by feature representation generator 502 for purposes of training the cascade of classifiers 506.

In general, the goal of training the cascade of classifiers 506 is to avoid the usual complexity of one-versus-all (e.g., is the device an iPhone 6 or another device, is the device an iPhone 7 or another device, etc.) or multinomial classification in which the amount of operations at evaluation time scales linearly with the number of classes. In contrast to these approaches, classifier trainer 504 may instead learn cascade of classifiers 506 as a label tree, probabilistic label tree, or the like, in various embodiments.

Generally, a label tree is a decision tree with one classifier at each node. Starting at the root, a first classifier is evaluated against an input feature point. The output of the classifier points to a child node. The classifier corresponding to that node is then evaluated, and so on, until a leaf of the tree is reached. The leaf then corresponds to a final label, which is the inferred device type. With K labels, good label trees of depth log 2(K) can be built, which only requires evaluation of a number of single-class classifiers that is logarithmic relative to the number of devices. This a key to scaling to a large number of device types without impacting the evaluation time.

Figure 7:
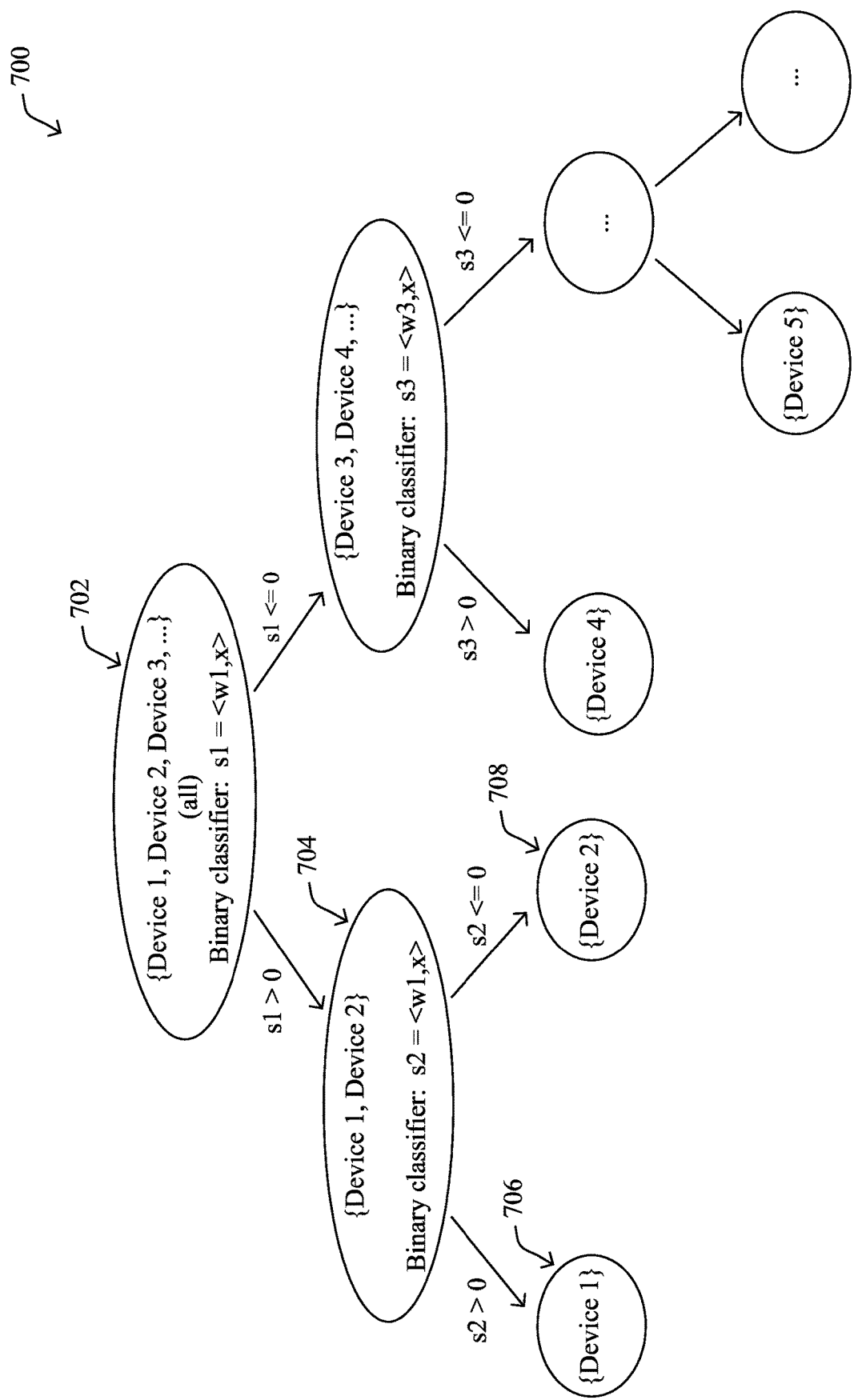
FIG. 7 illustrates an example label tree for device type classification.

FIG. 7 illustrates an example label tree 700 for device type classification, in some embodiments. Note that label tree 700 is simplified for purposes of illustration and can comprise any number of nodes, depending on the implementation. During evaluation, an input feature vector x may be compared against the various nodes/classifiers of label tree 700 (e.g., by traversing down a path of the tree). At each node, the set of prediction labels shrinks until a single device type label remains (e.g., at an end node of a branch of tree 700). In further embodiments, soft or probabilistic label trees can also be used for the labeling of a device.

By way of example, consider nodes 702-708 of label tree 700, each of which may correspond to a separate binary classifier. Initially, at root node 702, a binary classification of the input feature vector can be made, based on value of s1 (e.g., one or more features of the input feature vector). Here, the full set of device type labels {Device 1, Device 2, Device 3, . . . } may be possible device types for the device under scrutiny during the classification at node 702. Depending on the classification at step 702, processing in label tree 700 may continue on to node 704 (e.g., if s1>0). Here, only a subset of the full set of device type labels is associated with node 704, such as {Device 2, Device 3}, meaning that when s1>0, the pool of potential device types can be narrowed down to two possible types.

At node 704, another binary classification of the feature vector can ensue, now looking at the value of s2. Here, if s2>0, processing of label tree 700 continues on to node 706. Otherwise, processing of label tree 700 continues on to node 708. Both of nodes 706 and 708 are leaf nodes of label tree 700, meaning that they do not have any child nodes of their own. In addition, their pool of possible device labels may be reduced down to a single candidate. Accordingly, the device under scrutiny may be labeled as type 'Device 1,' if processing of tree 700 leads to node 706 or as type 'Device 2,' if processing of tree 700 leads to node 708.

Referring again to FIG. 5, although label trees represent one possible implementation of the cascade of classifiers 506 generated by classifier trainer 504, classifier trainer 504 can also employ other training methods whereby the class of the input point is refined. In addition, in further embodiments, classifier trainer 504 could also train a single classifier and omit the cascade, if computational performance at evaluation time is not a concern.

As part of the training of the cascade of classifiers 506, classifier trainer 504 could also enforce additional constraints. For example, classifier trainer 504 may employ sparsity-enforcing penalties or sparsity constraints, to prevent overfitting. In the context is of device classification with very large numbers of device types, it may be especially important to keep each classifier compact.

In various embodiments, another component of architecture 500 may be device labeler 508 that receives the feature vector(s) from feature representation generator 502 for a particular device under scrutiny and uses the trained cascade of classifiers 506 to label the device with a resulting device label 512. In turn, device labeler 508 may provide the determined device label 512 to any interested service in the network for purposes of policy enforcement, auditing, or for any other purpose. For example, a network security policy may prevent the device under scrutiny from accessing certain resources, based on its determined device type.

Figure 8:
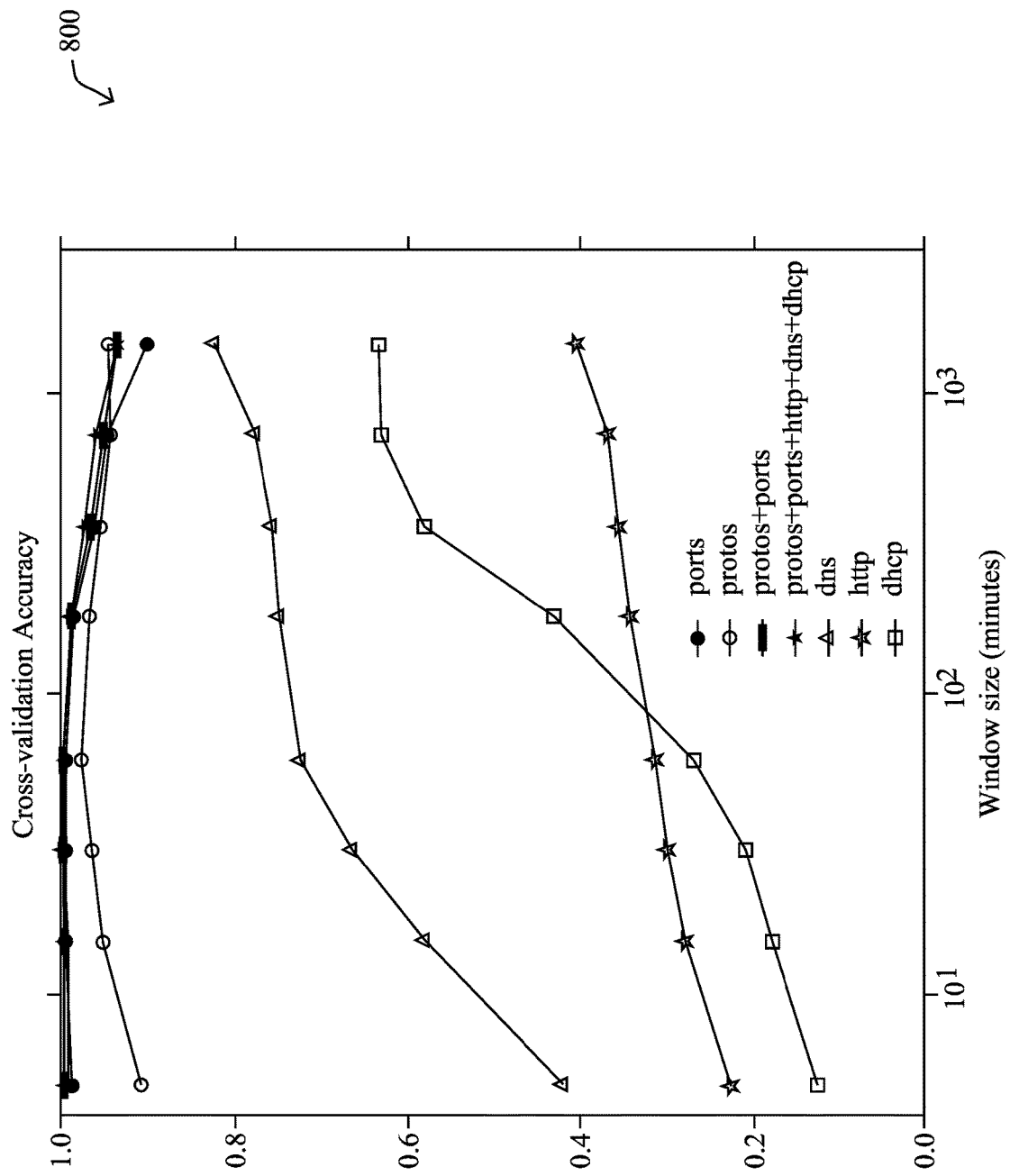
FIG. 8 illustrates an example plot of feature cross-validation accuracy by time window size.

A prototype was developed using the techniques herein by evaluating the packet captures for several dozen different types of devices. FIG. 8 illustrates an example plot 800 of feature cross-validation accuracy by time window size that was observed for the prototype. In particular, each line in plot 800 shows the cross-validation accuracy (roughly: the classification accuracy) as the window size used increases, for a given set of features. During testing, the port-related features used TCP/UDP port information, protos used Wireshark protocol dissection information, while DNS/HTTP/DHCP features were extracted from the corresponding packets.

From plot 800, it can be seen that larger time windows for DNS, HTTP, and DHCP features tend to result in higher classification accuracies. For other protocols (protos), there is a sweet spot around a window size of approximately one hour that gives the best accuracy. As would be appreciated, the techniques herein go beyond this simplified analysis by taking into account all window sizes at the same time, which is a more principled way than choosing a unique scale.

Figure 9:
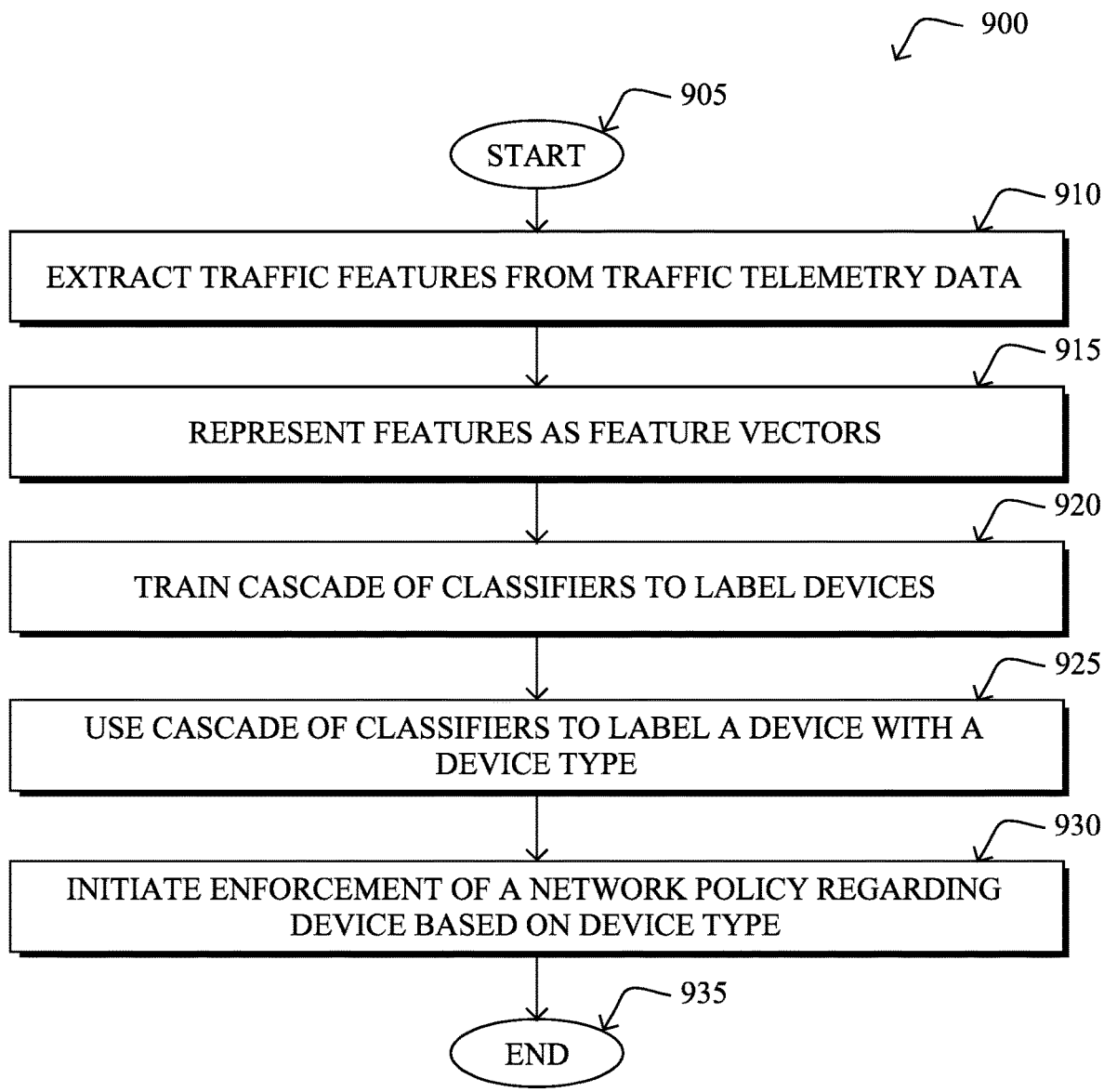
FIG. 9 illustrates an example simplified procedure for device type classification.

FIG. 9 illustrates an example simplified procedure for device type classification in a network, in accordance with one or more embodiments described herein. For example, a non-generic, specifically configured device (e.g., device 200) may perform procedure 900 by executing stored instructions (e.g., process 248), such as to provide a device classification service in the network. The procedure 900 may start at step 905, and continues to step 910, where, as described in greater detail above, the service may extract, for each of a plurality of time windows, one or more sets of traffic features of network traffic in a network from traffic telemetry data captured by the network. Such traffic features may include, but are not limited to, the protocol(s) used by the traffic, the addresses and/or ports used by the traffic, HTTP header information for the traffic (e.g., user-agent information, etc.), and/or any other information that can be captured regarding the traffic in the network.

At step 915, as detailed above, the service may represent, for each of the time windows, the extracted one or more sets of traffic features as feature vectors. In doing so, a particular feature vector for a particular time window may indicate whether each of the traffic features was present in the network traffic during that time window. For example, a particular value in the feature vector may be a binary value (e.g., '1' if the feature was observed or '0' if not) or, alternatively, could represent a weighting based on the frequency of observance of that traffic feature in the traffic during the time window. In some embodiments, the service may also aggregate feature vectors, to form further feature vectors across different time scales. For example, the service may aggregate feature vectors from different points in time during a single time window, to form a more fine-grained vector. Conversely, the service may aggregate feature vectors from multiple time windows, to form a more coarse-grained vector.

At step 920, the service may train, using a training dataset based on the feature vectors, a cascade of machine learning classifiers to label devices in the network with device types. For example, in some embodiments, the cascade of classifiers may correspond to a label tree or probabilistic label tree that performs a separate classification at each node, reducing the pool of potential device type labels down to one at its leaf nodes.

At step 925, as detailed above, the service may use the cascade of machine learning classifiers to label a particular device in the network with a device type based on the traffic features of network traffic associated with the particular device. Notably, the service may use a feature vector constructed from the traffic telemetry for the device as input to the cascade of classifiers trained in step 920, to label the device with a particular device type.

At step 930, the service may initiate enforcement of a network policy regarding the particular device based on its device type label, as described in greater detail above. For example, the service may cause a security system, traffic shaping system, or the like, to implement a security policy, traffic shaping policy, etc., based on the determined device type label for the device. Procedure 900 then ends at step 935.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for classifying the device type of a network device, it is to be understood that various other adaptations and modifications may be made within the spirit and scope of the embodiments herein. For example, while certain embodiments are described herein with respect to using certain models for purposes of device classification, the models are not limited as such and may be used for other functions, in other embodiments. In addition, while certain protocols are shown, such as HTTP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    extracting, by a device classification service and for each of a plurality of time windows, one or more sets of traffic features of network traffic in a network from traffic telemetry data captured by the network;
    representing, by the device classification service and for each of the plurality of time windows, the extracted one or more sets of traffic features as feature vectors, wherein each of the feature vectors corresponds to one of the plurality of time windows and comprises binary indicators indicating whether or not each of the traffic features was present in the network traffic during a corresponding time window;
    training, by the device classification service and using a training dataset based on the feature vectors, a cascade of machine learning classifiers to label one or more devices in the network with a device type;
    using, by the device classification service, the cascade of machine learning classifiers to label a particular device of the one or more devices with a particular device type based on the traffic features of network traffic associated with the particular device; and
    initiating, by the device classification service, enforcement of a network policy regarding the particular device based on its particular device type label,
    wherein representing, by the device classification service and for each of the plurality of time windows, the extracted one or more sets of traffic features as feature vectors comprises: assigning a weighting to a particular traffic feature in a feature vector based on a frequency of the particular traffic feature being present in the network traffic during the time window associated with that feature vector.

2. The method as in claim 1, wherein the device type is indicative of at least one of: a device make, a device model, or a device manufacturer.

3. The method as in claim 1, wherein the network policy comprises a network security policy that controls whether the particular device can access a particular network resource.

4. The method as in claim 1, wherein representing, by the device classification service and for each of the time windows, the extracted one or more sets of traffic features as feature vectors comprises:
    generating a feature vector for one of the time windows for inclusion in the training dataset by aggregating feature vectors for different points in time during that time window.

5. The method as in claim 4, wherein representing, by the device classification service and for each of the time windows, the extracted one or more sets of traffic features as feature vectors further comprises:
    generating a feature vector for inclusion in the training dataset by aggregating feature vectors from different time windows.

6. The method as in claim 1, wherein the cascade of machine learning classifiers comprises a label tree or probabilistic label tree.

7. The method as in claim 1, wherein the traffic features are indicative of at least one of:
    a protocol used by the network traffic or ports used by the network traffic.

8. An apparatus, comprising:
    one or more network interfaces to communicate with a network;
    a processor coupled to the network interfaces and configured to execute one or more processes; and
    a memory configured to store a process executable by the processor, the process when executed configured to:
        extract, for each of a plurality of time windows, one or more sets of traffic features of network traffic in the network from traffic telemetry data captured by the network;
        represent, for each of the plurality of time windows, the extracted one or more sets of traffic features as feature vectors, wherein each of the feature vectors corresponds to one of the plurality of time windows and comprises binary indicators indicating whether or not each of the traffic features was present in the network traffic during a corresponding time window;
        train, using a training dataset based on the feature vectors, a cascade of machine learning classifiers to label one or more devices in the network with a device type;
        use the cascade of machine learning classifiers to label a particular device of the one or more devices with a particular device type based on the traffic features of network traffic associated with the particular device; and
        initiate enforcement of a network policy regarding the particular device based on its particular device type label,
        wherein the apparatus represents, for each of the plurality of time windows, the extracted one or more sets of traffic features as feature vectors by: assigning a weighting to a particular traffic feature in a feature vector based on a frequency of the particular traffic feature being present in the network traffic during the time window associated with that feature vector.

9. The apparatus as in claim 8, wherein the device type is indicative of at least one of:
    a device make, a device model, or a device manufacturer.

10. The apparatus as in claim 8, wherein the network policy comprises a network security policy that controls whether the particular device can access a particular network resource.

11. The apparatus as in claim 8, wherein the apparatus represents, for each of the time windows, the extracted one or more sets of traffic features as feature vectors by:

generating a feature vector for one of the time windows for inclusion in the training dataset by aggregating feature vectors for different points in time during that time window.

12. The apparatus as in claim 8, wherein the apparatus represents, for each of the time windows, the extracted one or more sets of traffic features as feature vectors further by:
generating a feature vector for inclusion in the training dataset by aggregating feature vectors from different time windows.

13. The apparatus as in claim 8, wherein the cascade of machine learning classifiers comprises a label tree or probabilistic label tree.

14. The apparatus as in claim 8, wherein the traffic features are indicative of at least one of: a protocol used by the network traffic or ports used by the network traffic.

15. A tangible, non-transitory, computer-readable medium storing program instructions that cause a device classification service to execute a process comprising:
extracting, by the device classification service and for each of a plurality of time windows, one or more sets of traffic features of network traffic in a network from traffic telemetry data captured by the network;
representing, by the device classification service and for each of the plurality of time windows, the extracted one or more sets of traffic features as feature vectors, wherein each of the feature vectors corresponds to one of the plurality of time windows and comprises binary indicators indicating whether or not each of the traffic features was present in the network traffic during a corresponding time window;
training, by the device classification service and using a training dataset based on the feature vectors, a cascade of machine learning classifiers to label one or more devices in the network with a device type;
using, by the device classification service, the cascade of machine learning classifiers to label a particular device of the one or more devices with a particular device type based on the traffic features of network traffic associated with the particular device; and
initiating, by the device classification service, enforcement of a network policy regarding the particular device based on its particular device type label,
wherein representing, by the device classification service and for each of the plurality of time windows, the extracted one or more sets of traffic features as feature vectors comprises:
assigning a weighting to a particular traffic feature in a feature vector based on a frequency of the particular traffic feature being present in the network traffic during the time window associated with that feature vector.

16. The computer-readable medium as in claim 15, wherein the device type is indicative of at least one of: a device make, a device model, or a device manufacturer.

* * * * *

UNITED STATES PATENT AND TRADEMARK OFFICE
CERTIFICATE OF CORRECTION

Page 1 of 1

PATENT NO. : 11,025,486 B2
APPLICATION NO. : 16/164882
DATED : June 1, 2021
INVENTOR(S) : Pierre-André Savalle et al.

It is certified that error appears in the above-identified patent and that said Letters Patent is hereby corrected as shown below:

In the Specification

Column 9, Line 21, please amend as shown:
input telemetry data 410 captured by networking device Column 9, Line 63, please amend as shown:
profiling") to identify the device type of a device under Column 13, Line 27, please amend as shown:
vent overfitting. In the context of device classification Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*